(12) United States Patent
Ta et al.

(10) Patent No.: US 9,585,009 B2
(45) Date of Patent: Feb. 28, 2017

(54) ENHANCING PRIVACY IN CELLULAR PAGING SYSTEM USING PHYSICAL LAYER IDENTIFICATION

(71) Applicant: University of Maryland, College Park, a constituent institution of the University System of Maryland, itself a public agency and instrumentality of the State of Maryland, College Park, MD (US)

(72) Inventors: Tuan Ta, Lanham, MD (US); John S. Baras, Potomac, MD (US)

(73) Assignee: UNIVERSITY OF MARYLAND, College Park, MD (US)

( * ) Notice: Subject to any disclaimer, the term of this patent is extended or adjusted under 35 U.S.C. 154(b) by 125 days.

(21) Appl. No.: 14/210,611

(22) Filed: Mar. 14, 2014

(65) Prior Publication Data
US 2014/0274169 A1 Sep. 18, 2014

Related U.S. Application Data

(60) Provisional application No. 61/782,904, filed on Mar. 14, 2013.

(51) Int. Cl.
*H04W 68/00* (2009.01)
*H04W 12/02* (2009.01)
*H04W 68/02* (2009.01)
*H04W 12/12* (2009.01)

(52) U.S. Cl.
CPC ........... *H04W 12/02* (2013.01); *H04W 68/02* (2013.01); *H04W 12/12* (2013.01)

(58) Field of Classification Search
CPC .............................. H04W 68/02; H04W 68/00
USPC .................................... 455/458, 410
See application file for complete search history.

(56) References Cited

U.S. PATENT DOCUMENTS

| | | | |
|---|---|---|---|
| 8,848,904 B2 | 9/2014 | Baras et al. | |
| 9,161,214 B2 | 10/2015 | Baras et al. | |
| 2011/0228732 A1* | 9/2011 | Luo | H04L 5/001 370/329 |
| 2012/0203555 A1* | 8/2012 | Villette | G10L 21/038 704/270 |
| 2013/0163761 A1* | 6/2013 | Baras | H04W 12/02 380/270 |
| 2015/0079941 A1* | 3/2015 | Arkko | H04L 63/123 455/411 |

OTHER PUBLICATIONS

Kune, D.F. et al., "Location leaks over the GSM air interface", Proc. 19th Annual Network and Distributed System Security Symposium (2012), 11 pages.
Yu, et al., "Physical-Layer Authentication", IEEE Trans. on Information Forensics and Security, vol. 3, pp. 38-51 (2008).
(Continued)

*Primary Examiner* — Chuck Huynh
(74) *Attorney, Agent, or Firm* — Muir Patent Law PLLC (57) ABSTRACT

A method for negating location privacy attacks in cellular networks involves signal processing techniques at the physical identification layer. In particular the methodology involves embedding user's unique tags onto the downlink paging signal waveforms so that the tags are stealthy and robust. The scheme not only improves users' privacy but also saves system bandwidth.

21 Claims, 9 Drawing Sheets

(56) References Cited

OTHER PUBLICATIONS

Yu, et al., "Multicarrier authentication at the physical layer", WoWMoM (2008), 6 pages.

Nohl, et al., "GSM Sniffing", http://events.ccc.de/congress/2010/Fahrplan/attachments/1783 101228.27C3.GSM-Sniffing.Nohl Munaut.pdf, 23 pages.

F-Secure: 440,783 "Silent SMS" Used to Track German Suspects in 2010. http://www.f-secure.com/weblog/archives/00002294.html, Dec. 29, 2011, 2 pages.

3GPP TS 36.211: "Evolved Universal Terrestrial Radio Access (E-UTRA); Physical channels and modulation" (version 10.4.0) (2011), 103 pages.

3GPP TS 36.213: "Evolved Universal Terrestrial Radio Access (E-UTRA); Physical layer procedures" (version 10.4.0) (2011), 127 pages.

3GPP TS 36.321: "Evolved Universal Terrestrial Radio Access (E-UTRA); Medium Access Control (MAC)"; Protocol specification (version 10.4.0) (2011), 54 pages.

3GPP TS 36.331: "Evolved Universal Terrestrial Radio Access (E-UTRA); Radio Resource Control (RRC)"; Protocol specification (version 10.4.0) (2011), 300 pages.

Baker, M., Moulsley, T.: LTE —The UMTS Long Term Evolution From Theory to Practive, Second Edition, 2011, Table of Contents 11 pages and chapter 9 entitled "Downlink Physical Data and Control Channels", 14 pages (2011).

Edfors, et al,, "OFDM channel estimation by singular value decomposition", IEEE Trans. on Communications, vol. 46, pp. 931-939 (1998).

The OsmocomBB project—Open source GSM baseband software implementation. http://bb.osmocom.org/, (2011), 3 pages.

Ta and Baras, "Enhancing Privacy in LTE Paging System using Physical Layer Identification" was presented in Oct. 2012, at the $7^{th}$ International Workshop, DPM 2012 and $5^{th}$ International Workshop, SETOP 2012, Milano, Italy, Sep. 13-14, 2012 and published in 2013 (believed to be Jan. 8, 2013), 14 pages.

\* cited by examiner

ENHANCING PRIVACY IN CELLULAR PAGING SYSTEM USING PHYSICAL LAYER IDENTIFICATION

CROSS-REFERENCES TO RELATED APPLICATIONS

This application claims the benefit of the U.S. provisional patent application No. 61/782,904 filed on Mar. 14, 2013, which is incorporated herein by reference in its entirety.

GOVERNMENT SUPPORT

The subject matter disclosed herein was made with government funding and support under W911NF0710287 awarded by the ARO, FA95501010573 awarded by AFOSR, and HR001110300002 awarded by DARPA. The government has certain rights in this invention.

FIELD OF TECHNOLOGY

The exemplary embodiments of the subject matter described herein relate to wireless communication, and in particular to a method of ensuring location privacy for a user's equipment, from an eavesdropper, that is being paged by a serving base station to enable wireless communication.

BACKGROUND

In cellular networks, mobile stations (MS) are usually battery powered. To prolong the operational time of the MSs, the network architecture allows them to go into idle mode after being inactive for a certain period of time. In idle mode, the MSs do not sustain a connection with the serving base stations (BS). When there is a need to create a connection with an idle MS, e.g. voice calls, data, or system information updates, the BS sends out a notification to the MS in the form of a paging message. The location of an idle MS may have changed since the last time it was in communication. Therefore, the network maintains a tracking area for each idle MS.

A tracking area consists of several cells and the MS has to report if it moves out of the assigned tracking area. In general, paging messages are sent without any confidentiality protection, so that anyone can listen to those messages. The privacy of those being paged is provided through the use of temporary IDs. Those are IDs which only have meaning in the context of the idle MS and the serving network within the tracking area.

Recently, D. F. Kune et al. in "Location Leaks over the GSM air interface," Proceedings 19th Annual Network and Distributed System Security Symposium (2012), showed that despite the use of temporary IDs, the location of a user's cellphone in a GSM network can still be leaked. In particular, it was shown that an attacker can check if a user's cellphone is within a small area, or absent from a large area, without the user's awareness. Such vulnerability can lead to serious consequences. For example, in an oppressive regime, locations of dissidents can be revealed to suppressive agents without cooperation from reluctant service providers. Another example is that a thief, who attempts a break-in, can use the knowledge of the absence of the target to reduce the threat of encounter.

To perform this location attack, the attacker requires two capabilities: cause paging request messages to appear on the GSM Paging Control Channel (PCCH); and listen on the GSM PCCH broadcast channel.

In GSM networks, paging messages are sent on dedicated time-division channels. The Temporary Mobile Subscriber Identity (TMSI) is used for paging messages. The idea behind the location attack is that the adversary initiates a connection request to the user cellphone (this of course assumes that he knows the target's number), which results in a paging message being sent in the user's tracking area. By observing the paging channel, the adversary obtains a set of possible temporary IDs for the target user. Repeating this procedure several times, the adversary collects several sets of possible temporary IDs, from which he can do a set intersection analysis to get the temporary ID associated with the user's cellphone.

Practical experiments on T-Mobile and AT&T GSM networks show that after 2 or 3 repetitions, the adversary can pinpoint the temporary ID of a user's cellphone. To keep the user unaware of the attack, the connection request to his cellphone has to be terminated before a connection is established, but after the paging message is sent out. In the above referenced paper, the authors, through experiments, show that by calling the target's number and hanging up within 5 seconds, a paging message would be sent out, but the user's phone would not ring. Another way of achieving this goal is to send "silent SMS", a controversial method used by German and French police to track people.

SUMMARY

After reviewing the paging architecture in LTE networks the applicants were able to prove that a similar location privacy attack is possible in LTE networks. To solve this problem in LTE networks, applicants propose a solution using physical layer identification tags, as described in the exemplary embodiments that follow. Most security measures operate on the bit level and above. Applicants have gone further down, to the physical level of electromagnetic transmissions. Applicants' proposed methodology for solving this problem in LTE networks does not rely on cryptographic primitives.

Overcoming the location privacy attacks in GSM networks, as described above, required either additional control signaling (sending paging messages out to several tracking areas, changing TMSI more frequently) or introducing delay in response to users' requests. Applicants' solution for LTE networks requires neither of these measures. In fact, it requires less signaling than the current standard. However, it does require additional signal processing steps and therefore needs to be incrementally deployed.

It should be emphasized, however, that even though the additional signal processing is not in the standard, it is not computationally expensive. Therefore the effect on power consumption of the UEs is minimal.

Applicants' technique is inspired by the physical layer authentication scheme used for authenticating communications between sender and receivers of wireless communications, as described in U.S. Pat. No. 9,161,214, issued on Oct. 13, 2015, and incorporated herein by reference. In particular, the referenced published application describes a stealthy authentication technique in which the authenticating entity's credential is embedded as a watermark in the transmitted physical waveform. The authenticator detects the presence of the tag in the received waveform, and decides whether the waveform was transmitted by the legitimate transmitter or not.

Applicants have modified and extended this technique to the LTE network paging system by assigning to each user's equipment (UE) a unique tag. These tags are superimposed onto the paging transmitted waveform if the corresponding UEs are paged. The tags are transmitted with very low power such that they can only be detected, and not decoded. By detecting the presence of its tag, a UE learns that it is paged. Because of the stealth property of the tags, an eavesdropper observing the paging waveform learns nothing about who is being paged.

BRIEF DESCRIPTION OF THE DRAWINGS

These and further aspects of the exemplary illustrative non-limiting implementations will be better understood in light of the following detailed description of illustrative exemplary non-limiting implementations in conjunction with the drawings, of which.

DETAILED DESCRIPTION

Privacy-Enhanced Paging Messages

Applicants analyzed some technical specifications of LTE which establish that the location attacks in GSM networks can also occur in LTE networks. The details of the analysis will be used in creating the solution to the problem as described below.

Control Signaling:

In contrast to the GSM architecture, in LTE there is no dedicated resource for paging. Instead, the paging messages are delivered in the same frequency band as normal data; and the existence of such paging messages in each subframe (1 ms) is indicated in the control channel. In normal operation mode, at the beginning of each LTE downlink subframe, there are up to 4 (out of 14) OFDM symbols used to transmit control data. These Downlink Control Information (DCI) messages carry resource allocation information, Hybrid-ARQ, system information and paging indicator among others. Each control message is encapsulated in a Physical Downlink Control Channel (PDCCH) message. The DCI can be targeted to a specific user equipment (UE), or a group of UEs as in the case of a paging indicator. If the DCI is for a specific UE, the 16-bit CRC generated for that DCI will be XORed with the last 16 bits of the temporary ID of the targeted UE (e.g., Cell Radio Network Temporary Identifier C-RNTI). If the DCI is for a group of UEs, its CRC will be masked with one of the predefined IDs for group control information. The paging indicator ID, P-RNTI, is FFFE (in hexadecimal).

UE Decoding:

The UEs do not know a priori which PDCCH in the control region of a subframe is intended for them. Therefore they perform blind decoding, in which they try all possible sizes of PDCCH. The list of such allowable sizes can be found in 3GPP TS 36.331: Evolved Universal Terrestrial Radio Access (E-UTRA); Physical layer procedures (version 10.4.0) (2011). If after unmasking the CRC of a possible PDCCH message with either a common ID or the UE's temporary ID, the CRC check returns true, then the UE knows that it has successfully decoded a valid PDCCH message. To reduce the number of PDCCH the UEs have to try to decode, each UE is given a search space. The search space is all possible starting positions of a PDCCH. There are UE-specific search spaces and common search spaces. The latter are locations which all UEs have to try decoding from. Group control information, including paging indicator, is sent on the common search space. Due to the requirement that broadcast control information has to reach users with poor channel conditions, group PDCCH have bigger sizes than other PDCCH, which allows for lower code rates to be used. Two allowable sizes for these PDCCH are 72 and 144 resource elements. Resource element is the smallest resource unit in LTE, comprising of 1 subcarrier in 1 OFDM symbol. All control information are modulated with QPSK, therefore the paging PDCCH can have either 144 or 288 bits.

Figure 1:
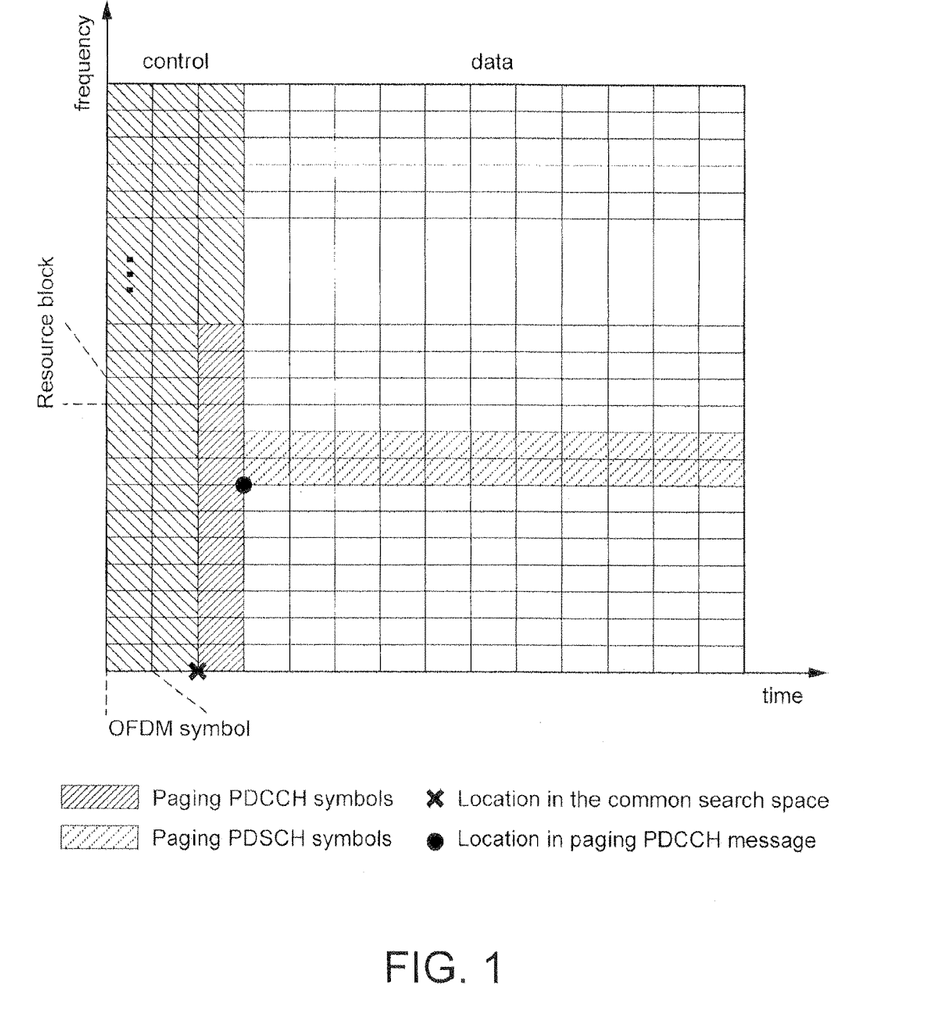
FIG. 1 illustrates an example of paging PDCCH and PDSCH in an LTE downlink subframe.

The DCI format for paging indicator is either 1A or 1C. Depending on the system bandwidth (1.4-20 MHz), DCI format 1A, and 1C can have 36-44, and 24-31 bits respectively. This DCI has the location of the paging record in the data portion of the subframe. The UE decodes that location in the Physical Downlink Shared Channel (PDSCH) to get the record. The paging record contains a list of IDs of UEs being paged, which can be either System Architecture Evolution TMSI (S-TMSI) or International Mobile Subscriber Identity (IMSI). In normal cases, the temporary ID S-TMSI is used instead of the permanent ID IMSI. If the UE sees its ID in the list, it knows that it is paged. FIG. 1 illustrates an example of paging PDCCH and PDSCH positions in an LTE downlink subframe (pilots and other type of physical channels are omitted for clarity).

Attacker Model:

Applicants used an analogous attacker model to that described above with respect to GSM networks. The only difference is that Applicants' attacker is capable of causing paging request messages in LTE networks and can listen on LTE paging channels. While the first capability of the attacker remains the same as in the above referenced paper, the above procedure serves to justify the practicality of the second capability. The attacker can listen on the control channel, and unmask PDCCH with P-RNTI. Once the attacker decodes a paging indicator, he can go to the specified location in PDSCH to obtain the list of paged IDs. In the D. F. Kune et al. paper an open source GSM baseband software implementation is used to read the TMSI of paged MSs. While an equivalent open source software for LTE baseband is not available at this moment, it is reasonable to expect that one will be developed in the future. Applicants concluded that the same location attack is feasible in LTE, and security measures should be taken proactively.

Figure 2A:
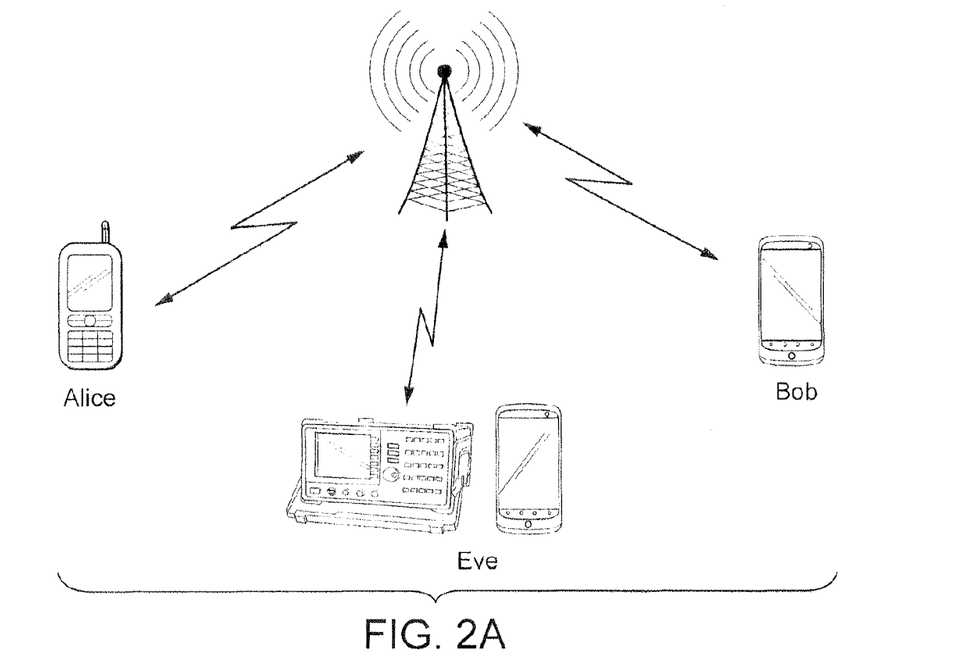
FIG. 2A depicts a scenario with one old UE and one new UE being paged at the same subframe.
Figure 2B:
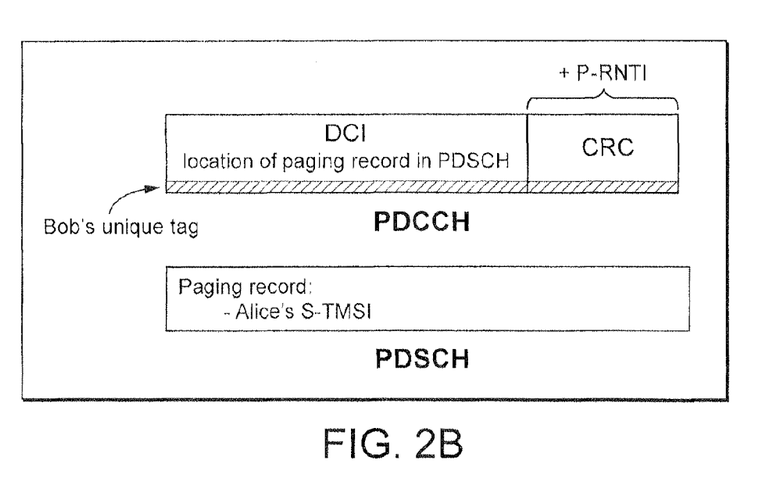
FIG. 2B shows PDCCH and PDSCH messages.

To combat the vulnerability in the LTE paging system described above, it is proposed to use a UE's temporary ID as an input to create a tag unique to that UE. If a UE is paged during a subframe, its tag is embedded onto the paging PDCCH. Preferably, tags from two different UEs are uncorrelated. Here "embed" means that the tag is superimposed onto the PDCCH QPSK symbols. To be backward compatible with older user equipment, the content of the paging indicator is left unchanged. A simple scenario where one old UE (Alice) and one new UE (Bob) are paged in the same subframe is illustrated in FIG. 2A, and FIG. 2B shows PDCCH and PDSCH paging messages.

If the tag embedding does not cause too much degradation to the PDCCH signal quality, "Alice" is still able to decode the control information and follow the standard procedure to see if she is paged. "Bob" however can determine if he is paged just by detecting the presence of his unique tag in the PDCCH. Therefore "Bob" does not need to decode the PDSCH, which saves battery considering that most UEs which expect paging messages are in idle mode. Listening on the paging channel, "Eve" can obtain "Alice's" temporary ID, but she cannot get "Bob's" tag. As will be shown later, "Bob's" tag is transmitted with very low power so that nobody (including "Bob") can decode it. "Bob" however can detect the presence of his tag in the paging PDCCH. Another benefit of this scheme comes in the form of downlink data bandwidth increase. Since "Bob's" ID is no longer needed to be transmitted in PDSCH, that bandwidth can be used for data transmission. The new UE capability as well as paging mechanism can be negotiated with the base station (eNodeB in LTE terms) at connection establishment.

Figures 3A, 3B:
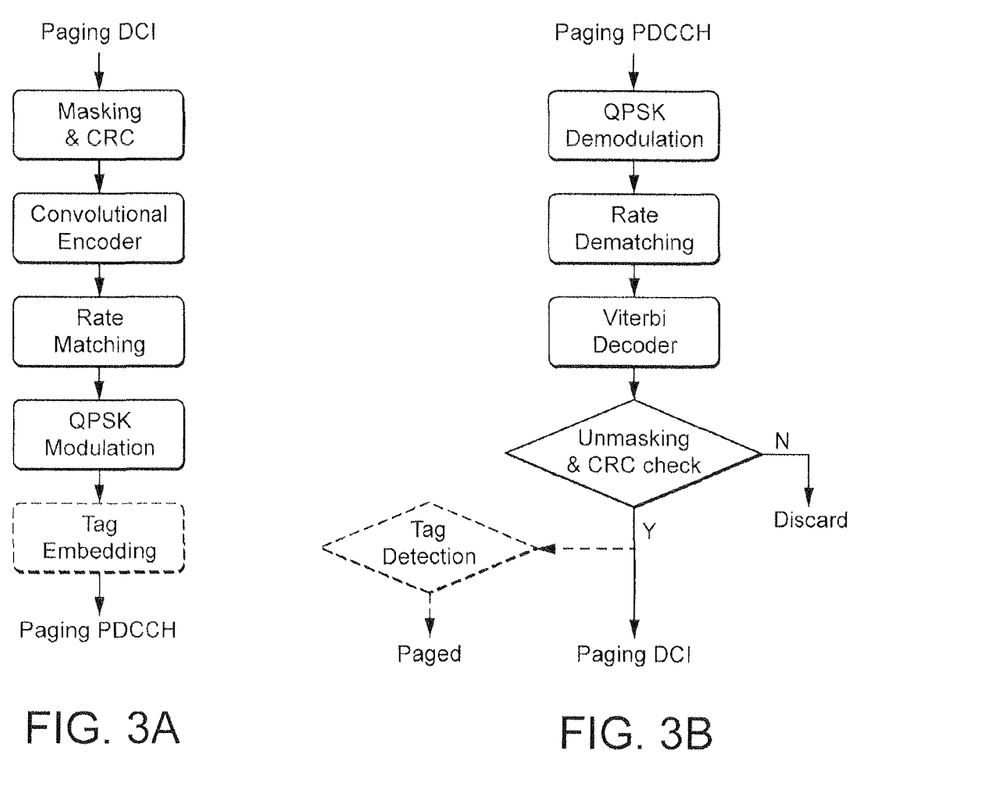
FIG. 3A is a flow charts for eNodeB.
FIG. 3B is a flow chart for User Equipment.

An illustrative exemplary embodiment of the operations at the eNodeB and UE in an LTE communication system are shown, respectively, in FIGS. 3A and 3B. For the eNodeB, shown in FIG. 3A, in S30 a paging DCI (downlink control information) is generated (which includes the location of paging records for backward compatible mobile devices in PDSCH). S32 generates CRC (cyclic redundancy check) for the paging DCI, and masks this CRC with the P-RNTI (Paging-Radio Network Temporary Identifier) (0xFFFE). S34 convolutionally encodes the concatenation of the paging DCI and the masked CRC to provide forward error correction.

In S36 rate matching is performed to achieve the desired code rate, and S38 modulates coded bits into QPSK symbols s. In S40 the tag embedding operation occurs: for all paged UEs i=1, ..., $N_t$: generates $i^{th}$ paged UE's tag (in QPSK symbols), $t_i$, from its temporary ID, $k_i$, using generator function $g(\bullet)$; generates the PDCCH QPSK symbols by superimposing s and $t_i$ (i=1, ..., $N_t$), with appropriate tag power controlled by system parameters $\rho_s$, $\rho_t$ $$x = \rho_s s + \frac{\rho_t}{\sqrt{N_t}} \sum_{i=1}^{N_t} t_i$$

In S42 standard LTE procedures are followed to transmit the PDCCH QPSK symbols, including the embedded tag.

For the UE, shown in FIG. 3B, in S44 standard LTE procedure is followed to receive a noisy version of downlink control QPSK symbols, $\hat{x}$ and in S46 the QPSK symbols are demodulated into bits. In S48 and S 50 rate de-matching and Viterbi decoding are performed to generate a candidate bit stream that may contain the paging DCI.

In S52 unmasking and CRC check is performed: for all possible PDCCH locations in the bit stream the operation unmasks (exclusive OR) CRC with P-RNTI then performs the CRC check. If the CRC check fails for all possible PDCCH locations, the standard LTE not-paged procedure is followed. If the CRC check succeeds, the UE obtains paging DCI $\hat{b}$ and the process proceeds to S54.

In S54 UE generates PDCCH symbols from the obtained paging DCI following a similar procedure as that of eNodeB, $\hat{s}=f_e(\hat{b})$. The following operations then occur: calculate the residue $$r = \frac{1}{\rho_t}(\hat{x} - \rho_s \hat{s})$$

using its tag t, calculate the test static $$\tau = t^H r$$

perform hypothesis testing on τ to determine whether t was embedded in x. If the answer to the hypothesis testing is no then the standard LTE not-paged procedure is followed. If the answer is yes, then the standard LTE paged procedure is followed.

The above described operational details for LTE eNodeB and EU are set forth in greater detail below. As will be readily understood by those skilled in the art, the illustrative exemplary embodiments described herein with respect to LTE communication networks are not meant to be limiting, and the general principles of the disclosed subject matter are also applicable for other communication networks.

To maximize the robustness of the tags, Applicants chose to put a tag symbol on every paging indicator PDCCH symbol. Applicants used QPSK to modulate the tags. With this configuration, the tags have the same length as the paging indicator PDCCH, which is either 144 or 288 bits. During a subframe, multiple tags can be superimposed on the same PDCCH, corresponding to multiple UEs being paged at the same time. In the LTE standard, the maximum size of the paging record is 16. In other words, the 3GPP standard leaves room for up to 16 UEs to be paged during 1 subframe. The performance of the proposed methodology will not be analyzed with respect to the number of simultaneous tags, $N_t$.

Detailed eNodeB Operations

Let b be the paging DCI. The PDCCH symbols that encapsulate this DCI are $s=f_e(b)$. Here $f_e(\bullet)$ is the encoding function, which includes CRC, convolutional encoding, rate matching, and QPSK modulation. Let $k_i$ i=1, ..., $N_t$, be the $i^{th}$ paged UE's ID. Generate the tag $t_i=g(k_i)$. As mentioned above, the functionality of the generator function $g(\bullet)$ is to create uncorrelated tags. The elements of b and $k_i$ are in bits; while the elements of s and $t_i$ are in QPSK symbols $\{\pm 1, \pm i\}$. The tags are superimposed onto the PDCCH to create the transmitted message $$x = \rho_s s + \frac{\rho_t}{\sqrt{N_t}} \sum_{i=1}^{N_t} t_i \quad (1)$$

Let $s=(s^{(1)}, \ldots; s^{(L)})$, i.e., there are L QPSK symbols in the PDCCH signal. For paging indicators, L=72 or 144. Assuming that each symbol of the PDCCH signal and of the tag has zero-mean and unit variance, We have $$E[s^{(k)}]=0, E[|s^{(k)}|^2]=1 \text{ for } k=1, \ldots, L$$

$$E[t_i^{(k)}]=0, E[|t_i^{(k)}|^2]=1 \; i=1, \ldots, N_t \quad (2)$$

Since the tags are uncorrelated among themselves and independent of the PDCCH symbols, $$E[s^H t_i] = 0, \quad i=1, \ldots, N_t \tag{3}$$

$$E[t_i^H t_j] = 0, \quad i,j=1, \ldots, N_t, \quad i \neq j \tag{4}$$

In (1), $\rho_s$ and $\rho_t$ are system parameters controlling the amount of power allocated to the signal and the tags, respectively. The power constraint is $$\rho_s^2 + \rho_t^2 = 1 \tag{5}$$

From (1)-(5), We have $$E[s] = E[t_i] = E[x] = 0$$

$$E[|s|^2] = E[|t_i|^2] = E[|x|^2] = L, \quad i=1, \ldots, N_t \tag{6}$$

Detailed User Equipment Operations

Decode DCI Assuming a frequency selective fading channel, the received signal at the UEs is $$y = Hx + w \tag{7}$$

where H is a diagonal matrix, with the elements being the attenuations at each subcarrier frequency, w is thermal noise at the transmitter and receiver circuitry. In LTE, pilot symbols are transmitted on fixed resource elements to help in channel estimation at the receivers. There are many techniques that the receiver can use to perform channel estimation, e.g. LMMSE. In general, the channel estimate can be written as $$\hat{H} = H + v \tag{8}$$

where v is the estimation error.

Let $\hat{H}^{(k)} = 1, \ldots, L$ be the diagonal elements of $\hat{H}$, the receiver estimates the message symbols as $$\hat{x}^{(k)} = \frac{\hat{H}^{(k)*}}{|\hat{H}^{(k)}|^2} y^{(k)} \tag{9}$$

$$= x^{(k)} - \frac{v^{(k)} x^{(k)}}{\hat{H}^{(k)}} + \frac{w^{(k)}}{\hat{H}^{(k)}}$$

It then decodes the DCI $$\hat{b} = f_d(\hat{x}) \tag{10}$$

Here $f_d(\cdot)$ is the decoding function, which maps QPSK symbols to bits, undoes rate matching, performs Viterbi decoding, and removes CRC. After unmasking with the paging ID (FFFE), the CRC check returns true if the DCI is successfully decoded.

Tag detection the UE regenerates the message symbols from the decoded DCI, $\hat{s} = f_e(\hat{b})$, and subtracts it from the received signal to get the residue $$r = \frac{1}{\rho_t}(\hat{x} - \rho_s \hat{s}) \tag{11}$$

Assuming that the UE performs perfect channel estimation, Applicants had $$r = \frac{1}{\sqrt{N_t}} \sum_{i=1}^{N_t} t_i + \frac{1}{\rho_t} \hat{H}^{-1} w \tag{12}$$

It then checks for the presence of its tag, t, by performing hypothesis testing on the statistic $$\tau = t^H r \tag{13}$$

The hypotheses are $H_0$: t is not present in r (null hypothesis)

$H_1$: t is present in r (alternative hypothesis)

The statistic under null hypothesis:

$$\tau \mid H_0 = \frac{1}{\sqrt{N_t}} \sum_{i=1}^{N_t} t^H t_i + \frac{1}{\rho_t} t^H \hat{H}^{-1} w \tag{14}$$

Condition on t, the second term in (14) is the sum of L Gaussian random variables $$\eta_2 = \frac{1}{\rho_t} t^H \hat{H}^{-1} w = \frac{1}{\rho_t} \sum_{k=1}^{L} \frac{t^{(k)*} w^{(k)}}{\hat{H}^{(k)}} \tag{15}$$

The resulting Gaussian random variable has mean zero and variance $$\sigma_{\eta_2}^2 = \frac{1}{\rho_t^2} \sum_{k=1}^{L} \frac{\sigma_w^2}{|H^{(k)}|^2} = \frac{1}{\rho_t^2} \sum_{k=1}^{L} \frac{1}{\gamma^{(k)}} \tag{16}$$

where $y^{(k)}$ is the SNR of $k^{th}$ subcarrier.

The first term in (14) can be written as:

$$\eta_1 = \frac{1}{\sqrt{N_t}} \sum_{i=1}^{N_t} t^H t_i = \frac{1}{\sqrt{N_t}} \sum_{i=1}^{N_t} \sum_{k=1}^{L} t^{(k)*} t_i^{(k)} \tag{17}$$

$\eta_1$ is the sum of $N_t L$ i.i.d. symbols from the set $\{\pm 1, \pm i\}$. According to the Central Limit Theorem, it can be approximated by a Gaussian random variable with zero-mean and variance $\sigma_{\eta_1}^2 = L$.

From (14)-(17), We have $$\tau \mid H_0 \sim N\left(0, L + \frac{1}{\rho_t^2} \sum_{k=1}^{L} \frac{1}{\gamma^{(k)}}\right) \tag{18}$$

The statistic under alternative hypothesis: Without loss of generality, let $t = t_1$. The statistic is $$\tau \mid H_1 = \frac{1}{\sqrt{N_t}}\left(|t_1|^2 + \sum_{i=2}^{N_t} t_1^H t_i\right) + \frac{1}{\rho_t} t_1^H \hat{H}^{-1} w \tag{19}$$

Condition on $t_1$, the term inside the parentheses in (19) can be approximated as a Gaussian random variable with mean $|t_1|^2 = L$ and variance $(N_t - 1) L$. Therefore $$\tau \mid H_1 \sim N\left(\frac{L}{\sqrt{N_t}}, \frac{N_t-1}{N_t}L + \frac{1}{\rho_t^2}\sum_{k=1}^{L}\frac{1}{\gamma^{(k)}}\right) \quad (20)$$

The UE performs a threshold test on T to determine the presence of its tag in the residue.

$$H = \begin{cases} H_0 & \text{if } \tau \leq \tau^0 \\ H_1 & \text{if } \tau > \tau^0 \end{cases} \quad (21)$$

In making the comparison in (21), We used only the real part of τ. The imaginary parts of τ|H₀ and τ|H₁ have very similar statistic, and therefore do not provide much information. By abuse of notation, We still called the real part τ. The threshold $\tau^0$ is a value between $[0, L/\sqrt{N_t}]$. The greater $\tau^0$ is, the higher the probability of miss detection; whereas the smaller $\tau^0$ is, the higher the probability of false alarm. We chose $\tau^0 = L/2\sqrt{N_t}$ for good performance in both criteria. With this choice of the threshold, the probability of missing a tag is $$P_m = \Phi\left(\frac{-\frac{L}{2\sqrt{N_t}}}{\left(\frac{N_t-1}{N_t}L + \frac{1}{\rho_t^2}\sum_{k=1}^{L}\frac{1}{\gamma^{(k)}}\right)^{1/2}}\right) \quad (22)$$

where $\Phi(\cdot)$ is the standard Gaussian cumulative distribution function. To get an idea of the theoretical performance of the scheme, let us look at a special case where the channel is at flat, fading with SNR=10 dB. Assume 10% of the transmitted power is allocated to tags, i.e. $\rho_t^2=0.1$; and 288 bits are used for PDCCH message, i.e. L=144. When 4 users are paged simultaneously, i.e. $N_t=4$, we have $P_m=0.01$. So one can see under that condition, the tags are detected 99% of the time.

Simulations

As mentioned above, the PDCCH messages are designed to be very robust. In particular, a low rate (1/3) convolutional code is used. In addition, the paging DCI message can have 24-44 bits. Together with a 16-bit CRC, the size of the message before convolutionally encoded ranges from 40 to 60 bits. Thus the size of the message after convolutionally encoded ranges from 120 to 180 bits. When the PDCCH size is 144 bits, puncture may occur during rate matching. When the PDCCH size is 288 bits, redundant encoded bits are transmitted which effectively increases the SNR at the receiving UEs.

Figure 4A:
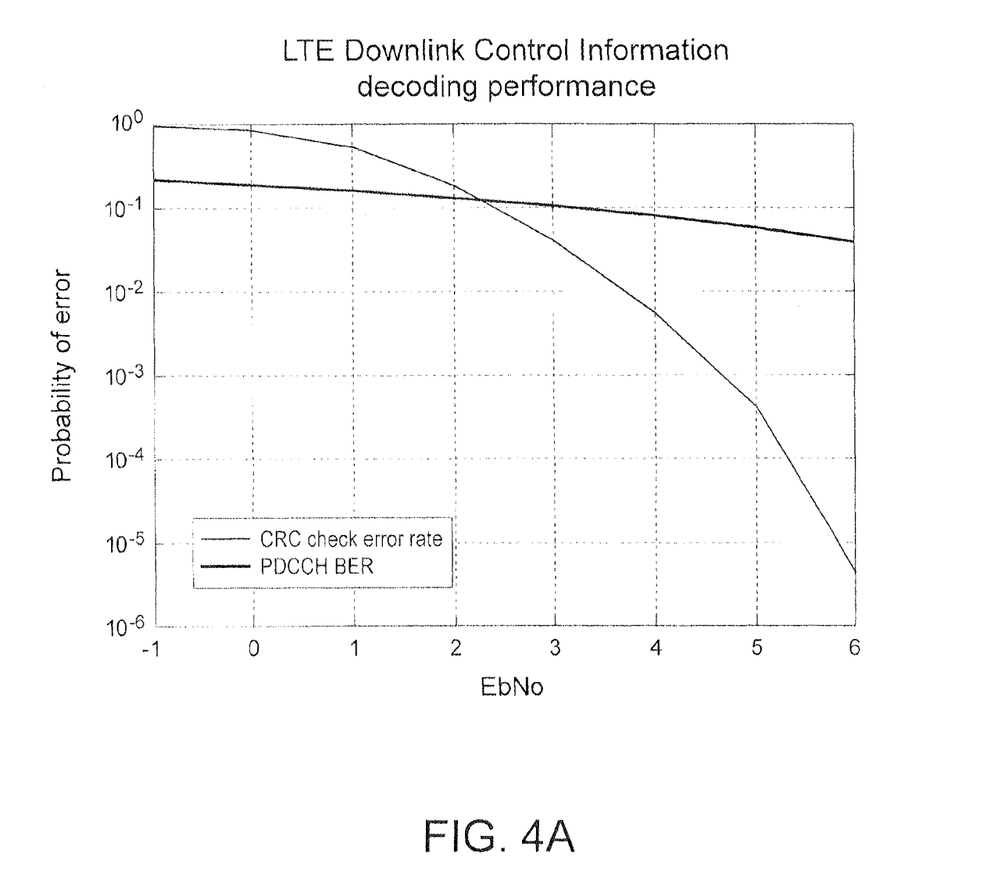
FIG. 4A shows DCI decoding performance as a function of SNR wherein the DCI size is 44 bits and the PDCCH size is 144 bits.
Figure 4B:
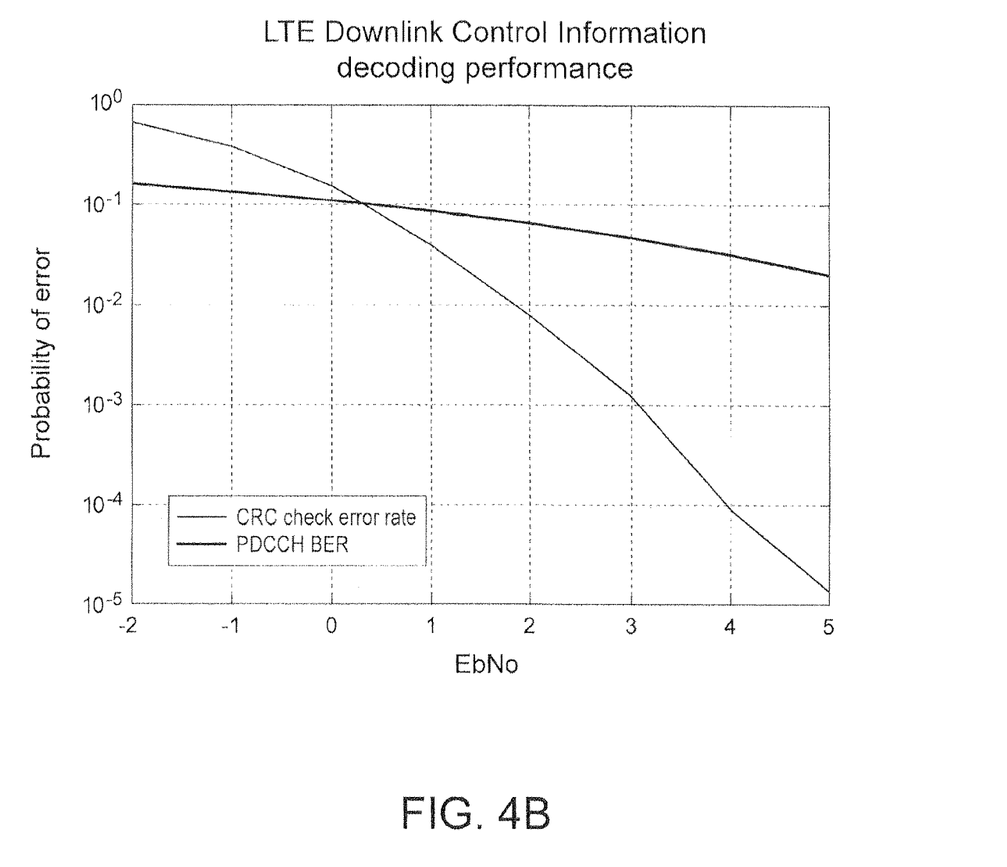
FIG. 4B shows DCI decoding performance as a function of SNR wherein the DCI size is 44 bits and the PDCCH size is 288 bits.

In order to evaluate the effect of the embedded tags on the probability of successfully decoding the DCI, we first simulated the DCI decoding performance with respect to different SNR levels. The results are shown in FIGS. 4A and 4B for, respectively, 144 bits and 288 bits. Here we used the energy per bit to noise power spectral density (EbNo) as the metric for SNR. Also shown is BER of the PDCCH message at the same EbNo levels. FIGS. 4A and 4B give a clear intuition of the PDCCH BER requirements for various DCI decoding performances. For instance, with PDCCH size of 288 bits, one can see that the probability of unsuccessfully decoding a paging DCI decreases rapidly from 0.4 at EbNo=-1 to $10^{-5}$ at EbNo=5. Thanks to the convolutional encoder, the BER required for PDCCH to achieve $10^{-5}$ DCI error rate is only 0.03. When the size of PDCCH is 144 bits, the UEs need an additional 1 dB in SNR to get equivalent performance.

Figure 5:
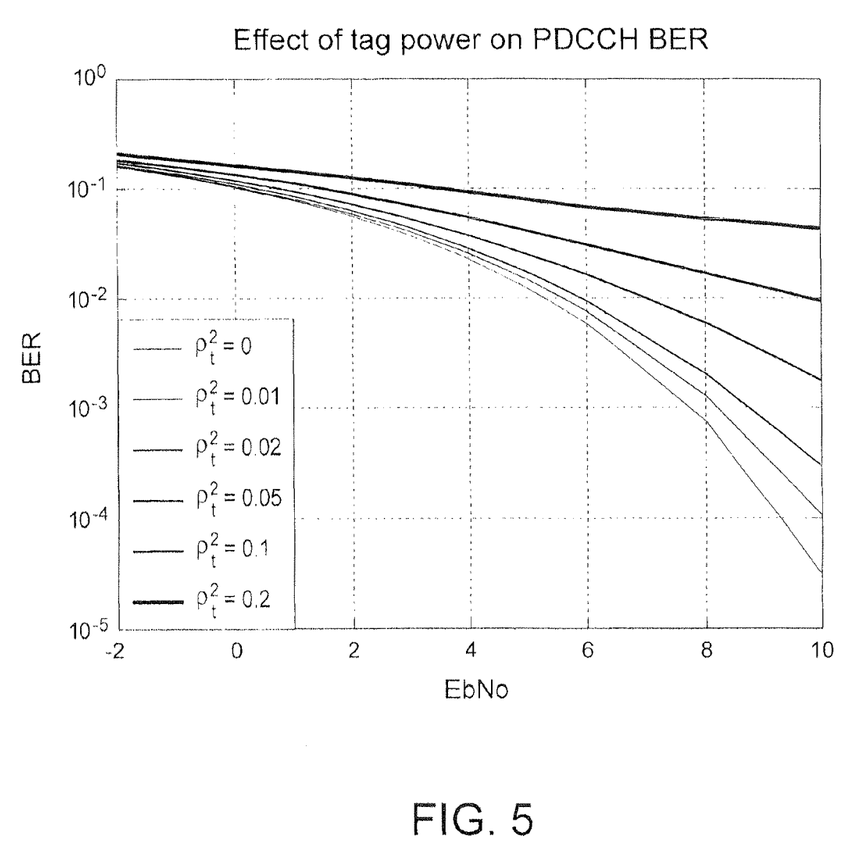
FIG. 5 shows the effect of tag power on PDCCH BER for various values of tag power allocation where the PDCCH size is 288 bits, 16 tags are embedded.

Next we wanted to see the effect of allocating part of the transmission power to the tags on the PDCCH BER. As long as the resulting BER conforms to the requirement obtained above, the scheme will not have a negative effect on the DCI decoding performance. FIG. 5 shows the BER of PDCCH message for various tag powers. We can see that the effect of tag embedment was minimal for $\rho_t^2 \leq 0.02$.

When the channel condition is good, e.g. EbNo=10 dB, 20% of the power can be allocated to tags, which results in BER of 0.04. Referring back to FIG. 4B, this BER corresponds to a DCI decoding error rate of $10^{-4}$. After confirming that we can indeed allocate part of the transmission power to the identification tags, we evaluated the tag detection performance under various system settings. In particular, we altered 3 parameters: tag length, tag power and number of simultaneous tags. We expected the detection performance to increase with tag length and decrease with number of simultaneous tags. Referring back to (18) and (20), we saw that the variance of the test statistic decreases monotonically with increased tag power, and therefore the detection performance will increase monotonically with increased tag power. However, we also knew that increasing tag power degrades DCI decoding performance. If that degradation causes the UEs to fail to decode the paging PDCCH then the tags will be useless. Referring to FIG. 5, we chose tag power allocation $\rho_t^2=0.05$ to be conservative.

Figure 6A:
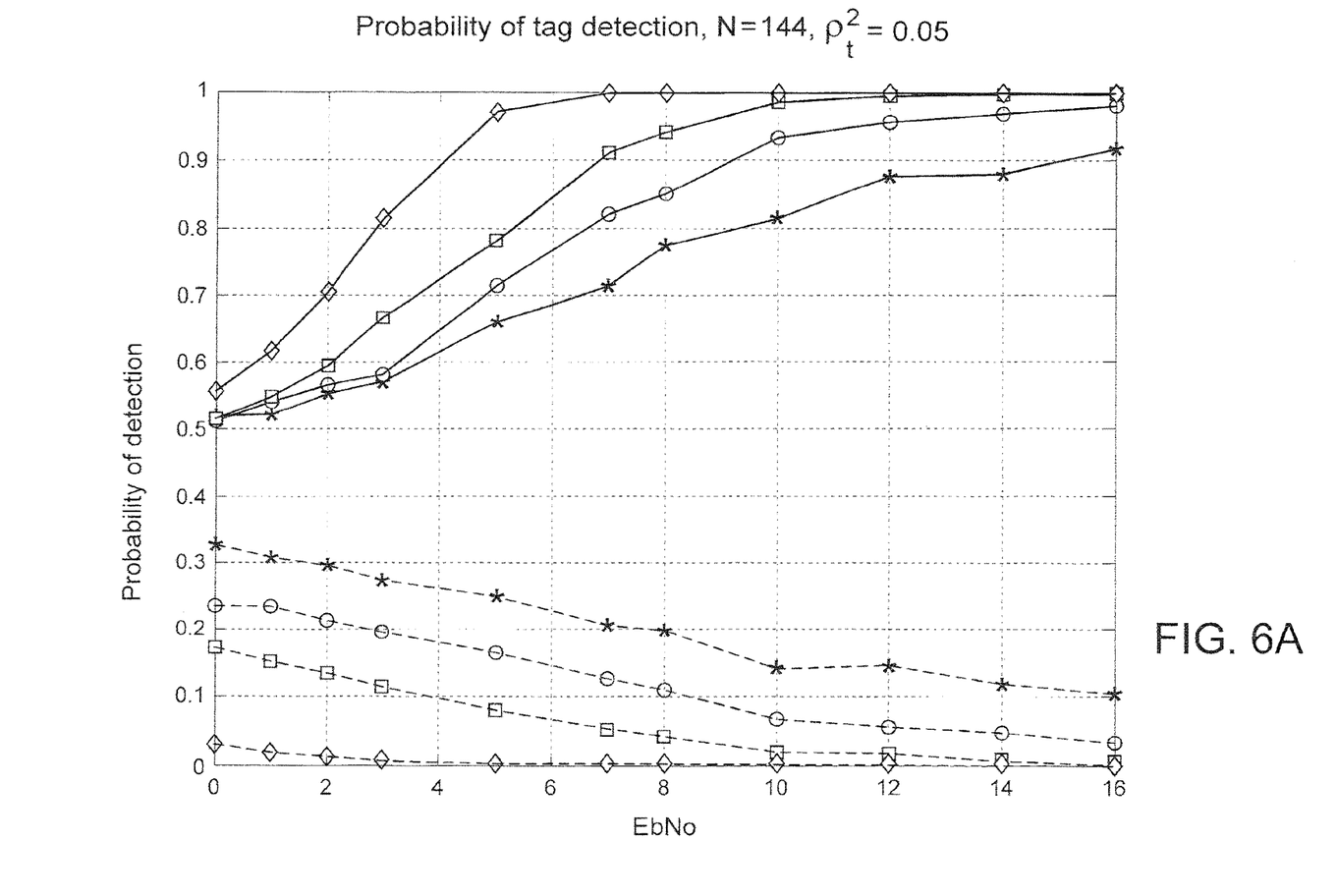
FIG. 6A shows the probability of tag detection for PDCCH size of 144 bits.
Figure 6B:
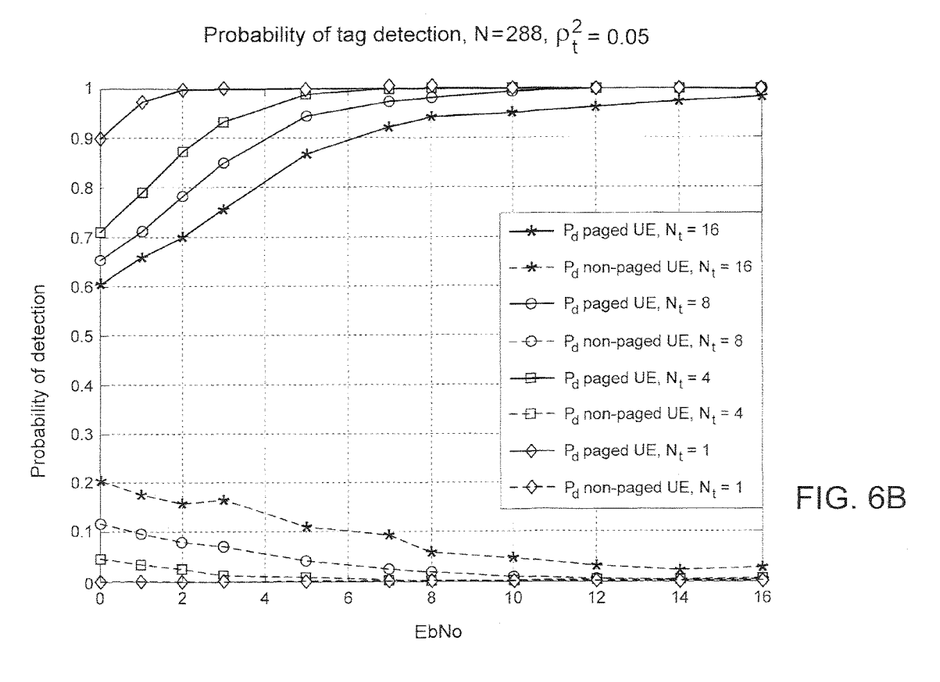
FIG. 6B shows the probability of tag detection for PDCCH size of 288 bits.

FIG. 6A (PDCCH size 144 bits) and 6B (PDCCH size 288 bits) show the probabilities of detecting that the unique tag for a UE is present in two cases: the UE is being paged, and the UE is not being paged (misdetection). We saw a clear superior performance when 288-bit PDCCH is used (shown in FIG. 6B). Applicants considered a rather bad channel condition, EbNo=2 dB, 4 UEs are paged simultaneously. FIG. 6B shows that the scheme still provides tag detection rate of 90% and false alarm rate of 2% if we used 288-bit PDCCH and allocate 5% of the transmission power for the tags. A natural question would be how this performance compares to the current paging system. Both schemes rely on the successful decoding of the paging PDCCH. After this stage, the scheme's performance ties directly to the detection probability of the tags; whereas the current scheme's performance depends on the success of decoding the paging PDSCH. Since these are apples and oranges, a meaningful comparison can only be done through experiments. We noticed that the constellation size and code rate used for data channels are a lot more aggressive than those used for control channels. Therefore it is expected that decoding performance of data channels are worse than that of control channels in the same SNR condition.

Figure 7:
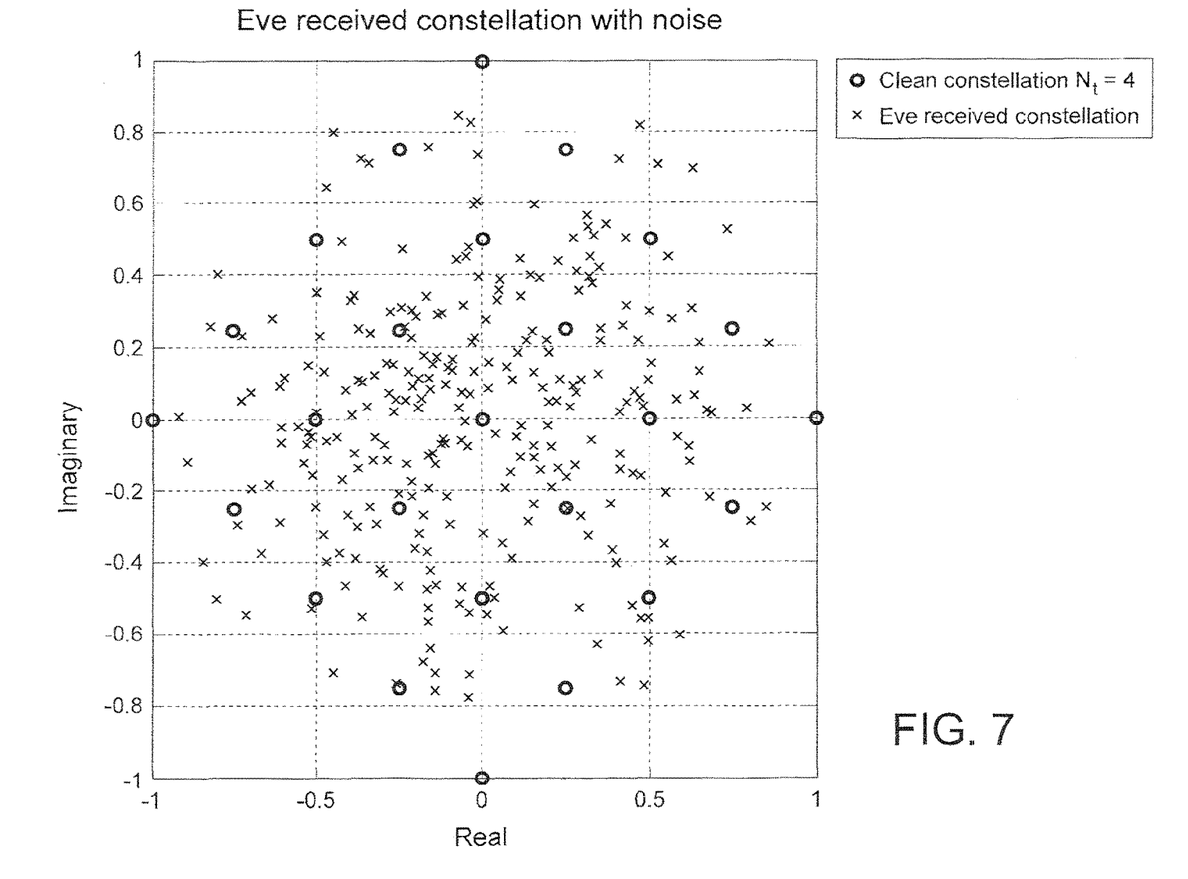
FIG. 7 depicts an eavesdropper's received constellation at SNR=20 dB, $N_t$=4.

The idea behind the physical layer identification technique is to make use of channel noise to obfuscate the tags at the eavesdropper. Assuming that the eavesdropper, "Eve" in FIG. 2A, successfully decodes the paging PDCCH, regenerates the signal s in (1), and subtracts it from her received waveform. What she has left is the sum of the superimposed tags and the channel noise. Since the individual tags are modulated as QPSK symbols ($\pm 1, \pm i$), the normalized sum of multiple tags will have the constellation as shown in FIG. 7. The identity of a UE's tag, say "Bob's," is hidden under two layers. First, the channel noise limits "Eve" to only partial information about the normalized sum of the tags. Second, since the tags are uncorrelated, the sum of them does not reveal any information about "Bob's" tag to "Eve."

As a result, "Eve" has no reliable way of obtaining "Bob's" tag, and thus she cannot perform a location attack.

In the illustrative exemplary embodiments described herein, a method for paging user equipment in LTE networks while protecting their privacy has been set forth. The method makes use of physical layer identification tags, which are designed to be robust and stealthy. The proposed methodology protects the privacy of paged users by hiding their ID in the transmitted waveforms. Using channel noise as an advantage, the proposed methodology prevents an attacker from decoding the paged user's tag. As a result, attacks on the open nature of the paging channel, are no longer a privacy threat. The methodology also provides bandwidth saving by not requiring the actual user IDs to be transmitted.

Although the illustrative exemplary embodiments have been described with respect to LTE networks those skilled in the art will readily recognize that they are also applicable to other cellular networks including, but not limited to, GSM, WCDMA, and WiMAX.

What is claimed:

1. A computer implemented method for a wireless communication system including a base station paging system for locating a mobile station within the base station dedicated broadcast region while preserving the location privacy of the located mobile station, the method comprising:
    at least one processor with accessible input/output and at least one data store to perform the following:
    generating a paging message;
    performing channel coding on the paging message;
    modulating the coded paging message;
    generating a unique tag for each one of a plurality of mobile stations;
    embedding at least one of said generated unique tags with the modulated coded paging message; and
    transmitting the modulated coded paging message with the at least one embedded unique tag,
    wherein the total transmitting power of the at least one embedded unique tag ranges from 0.01 to 0.2 of the modulated coded paging message transmitting power.

2. The method claimed in claim 1, each one of said unique tags being generated based on the corresponding mobile device's temporary ID.

3. The method claimed in claim 1, wherein the wireless communication system is LTE and the paging message comprises downlink control information (DCI), and the method further comprises:
    generating a cyclic redundancy check (CRC) for the paging DCI;
    masking the CRC with a Paging-Radio Network Temporary Identifier (PRNTI);
    concatenating the masking result to the paging DCI;
    performing convolutional coding and rate matching to create coded DCI bits; and
    modulating the coded DCI bits.

4. The method claimed in claim 1, wherein the modulation is QPSK.

5. The method claimed in claim 1, wherein the generated unique tags are uncorrelated.

6. The method claimed in claim 1, wherein the wireless communication system is GSM.

7. The method claimed in claim 1, wherein the wireless communication system is WCDMA.

8. The method claimed in claim 1, wherein the wireless communication system is WIMAX.

9. A computer implemented method for a wireless mobile device used in a wireless communication system which responds to a base station paging signal while preserving the location privacy of the mobile device, the method comprising:
    at least one processor with accessible input/output and at least one data store to perform the following:
    receiving a paging signal from a base station;
    demodulating the paging signal;
    demodulating and decoding the paging signal into bits;
    detecting whether a unique tag assigned to the wireless mobile device has been received in the paging signal; and
    responding to the base station paging signal if the unique tag has been detected,
    wherein the power level of the unique tag ranges from 0.01 to 0.2 of the received paging signal power.

10. The method claimed in claim 9, said unique tag being generated based on the mobile device's temporary ID.

11. The method claimed in claim 9, wherein the wireless communication system is LTE.

12. The method claimed in claim 9, wherein the wireless communication system is GSM.

13. The method claimed in claim 9, wherein the wireless communication system is WCDMA.

14. The method claimed in claim 9, wherein the wireless communication system is WIMAX.

15. A computer implemented method for a wireless communication system, having at least one base station and at least one mobile device, for locating the mobile device within the base station dedicated broadcast region while preserving the location privacy of the located mobile device, the method comprising:
    the at least one base station having at least one processor with accessible input/output and at least one data store to perform the following:
    generating a paging message;
    performing channel coding on the paging message;
    modulating the coded paging message;
    generating a unique tag for each one of a plurality of mobile stations;
    embedding at least one of said generated unique tags with the modulated coded paging message;
    transmitting the modulated coded paging message with the at least one embedded unique tag; and
    each one of said plurality of mobile stations having at least one processor with accessible input/output and at least one data store to perform the following:
    receiving a paging signal from the at least one base station;
    demodulating the paging signal;
    demodulating and decoding the paging signal into bits;
    detecting whether the unique tag for the corresponding one of a plurality of mobile stations has been received in the paging signal; and
    responding to the base station paging signal if the unique tag has been detected,
    wherein the total transmitting power of the at least one embedded unique tag ranges from 0.01 to 0.2 of the modulated coded paging message transmitting power.

16. The method claimed in claim 15, each one of said unique tags being generated based on the corresponding mobile device's temporary ID.

17. The method claimed in claim 15, wherein the wireless communication system is LTE.

18. The method claimed in claim 15, wherein the wireless communication system is GSM.

19. The method claimed in claim 15, wherein the wireless communication system is WCDMA.

20. The method claimed in claim 15, wherein the wireless communication system is WIMAX.

21. The method claimed in claim 15, wherein the generated unique tags are uncorrelated.

* * * * *